(12) United States Patent
Stretch

(10) Patent No.: US 7,980,483 B2
(45) Date of Patent: Jul. 19, 2011

(54) INJECTOR FOR A FLUID INJECTION SYSTEM

(75) Inventor: Dale A. Stretch, Novi, MI (US)

(73) Assignee: Eaton Corporation, Cleveland, OH (US)

( * ) Notice: Subject to any disclaimer, the term of this patent is extended or adjusted under 35 U.S.C. 154(b) by 179 days.

(21) Appl. No.: 12/250,220

(22) Filed: Oct. 13, 2008

(65) Prior Publication Data
US 2010/0090034 A1 Apr. 15, 2010

(51) Int. Cl.
*F02D 1/06* (2006.01)

(52) U.S. Cl. ............... 239/1; 239/5; 239/124; 239/125; 239/132; 239/585.1; 239/585.5; 60/282

(58) Field of Classification Search ............ 239/1, 5, 239/96, 124, 125, 127, 132–132.5, 585.1, 239/585.4, 585.5; 60/282, 286
See application file for complete search history.

(56) References Cited

U.S. PATENT DOCUMENTS

| | | | |
|---|---|---|---|
| 3,737,100 A | 6/1973 | Dreisin | |
| 6,539,708 B1 * | 4/2003 | Hofmann et al. | 239/585.1 |
| 6,814,303 B2 * | 11/2004 | Edgar et al. | 60/286 |
| 7,467,749 B2 * | 12/2008 | Tarabulski et al. | 239/5 |

FOREIGN PATENT DOCUMENTS

| | | |
|---|---|---|
| CH | 237848 | 5/1945 |
| DE | 102004050022 | 4/2006 |
| DE | 102005028601 | 12/2006 |
| EP | 2025920 | 2/2009 |
| WO | WO-2005005799 | 1/2005 |

OTHER PUBLICATIONS

European Search Report dated Mar. 2, 2010 (2 pages).
Delphion English Abstract for DE102004050022 (4 pages).
Delphion English Abstract for EP2025920 (3 pages).
Delphion English Abstract for DE102005028601 (3 pages).

* cited by examiner

*Primary Examiner* — Steven J Ganey
(74) *Attorney, Agent, or Firm* — Rader, Fishman & Grauer PLLC

(57) ABSTRACT

An injector for an injection system is provided, including a first opening, a second opening, an open position and a closed position. The first opening is for spraying the fluid out of the injector, and the second opening is for allowing the fluid to exit the injector. When the injector is in the open position, the injector sprays the fluid from the first opening and the flow of the fluid to the second opening is substantially blocked. When the injector is in the closed position the injector allows the fluid to exit the injector from the second opening. The injector substantially blocks the spray of the fluid from the first opening when the injector is in the closed position.

18 Claims, 4 Drawing Sheets

Open-Position

Closed-Position

INJECTOR FOR A FLUID INJECTION SYSTEM

TECHNICAL FIELD

The present disclosure relates to an injector, and in particular to an injector for a fluid injection system.

BACKGROUND

Exhaust gas after treatment systems are commonly used in conjunction with diesel engines for reducing the amount of nitrous oxides ($NO_x$) in an exhaust gas. One type of after treatment system includes an injector for spraying a reduction agent, such as ammonia, fuel or urea, into the exhaust gas. The exhaust gas is then transported to a mechanism such as a catalytic converter, where the amount of nitrous oxides in the exhaust gas is reduced as the reduction agent reacts with the nitrous oxides in the exhaust gas to form water and nitrogen. After reacting in the catalytic converter, the exhaust gas is released from the catalytic converter and ultimately to the atmosphere.

In one type of after treatment system, the injector may include at least one orifice, such as an injection orifice, for spraying the reduction agent into the exhaust gas. The injector may spray a mist of the reduction agent into the exhaust gas. A very fine mist of reduction agent is typically desirable. Spraying droplets of reduction agent that are smaller in size usually results in a more efficient reaction between the reduction agent and the exhaust gas. As the pressure drop across the injector orifice increases, the size of the droplets of the reduction agent generally decreases, and the injector sprays a finer mist of the reduction agent into the exhaust gas.

SUMMARY

Figure 1:
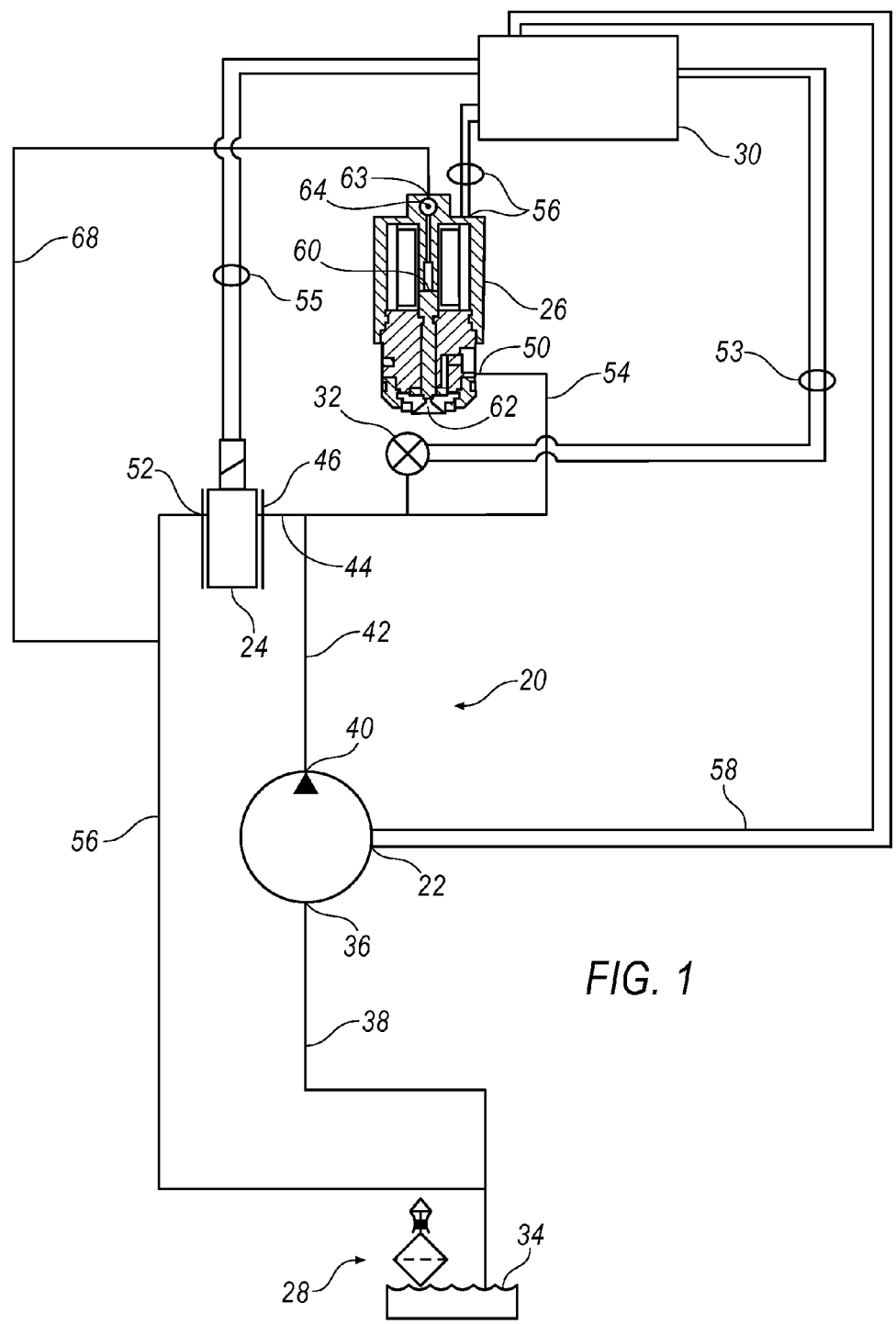
FIG. 1 is a schematic diagram of a exemplary fluid injection system.

According to various exemplary illustrations described herein, an injector for an injection system is provided. The injector may include a first opening, a second opening, an open position and a closed position. The first opening may be configured for spraying a fluid out of the injector, and the second opening may be configured for allowing the fluid to exit the injector. When the injector is in the open position, the fluid may be sprayed from the first opening, and the flow of the fluid to the second opening may be substantially blocked. When the injector is in the closed position, the fluid may be allowed to exit the injector from the second opening. The injector may be configured for at least partially blocking the spray of the fluid from the first opening when the injector is in the closed position. The injector may also include a needle and a needle guide, where the needle may be slidably disposed within a passage of the needle guide. The injector may be in the closed position when the needle engages the second opening, and the injector may be in the open position when the needle engages the first opening. The injector may also include an injection orifice seat where the needle may be seated on the injection orifice seat when the injector is in the closed position. The injector may also include either an inner seating feature or an outer seating feature. The needle may be seated on one of the inner seating feature and the outer seating feature when the injector is in the open position.

A process for injecting a fluid from an injection system is also disclosed. The process may include transporting the fluid from a reservoir tank to a fluid inlet of an injector, where the reservoir may be in communication with the fluid inlet by way of a pressure line. The fluid may be sprayed from a first opening of the injector when the injector is in an open position. The fluid may be allowed to exit the injector from a second opening of the injector and into the reservoir tank when the injector is arranged in a closed position. The injector may be configured for at least partially blocking the spray of fluid from the first opening when the injector is in the closed position.

DETAILED DESCRIPTION

Referring now to the discussion that follows and also to the drawings, illustrative approaches to the disclosed systems and methods are shown in detail. Although the drawings represent some possible approaches, the drawings are not necessarily to scale and certain features may be exaggerated, removed, or partially sectioned to better illustrate and explain the present disclosure. Further, the descriptions set forth herein are not intended to be exhaustive or otherwise limit or restrict the claims to the precise forms and configurations shown in the drawings and disclosed in the following detailed description.

Moreover, a number of constants may be introduced in the discussion that follows. In some cases illustrative values of the constants are provided. In other cases, no specific values are given. The values of the constants will depend on characteristics of the associated hardware and the interrelationship of such characteristics with one another as well as environmental conditions and the operational conditions associated with the disclosed system.

Turning now to the drawings, FIG. 1 illustrates an exemplary fluid injection system 20, illustrated as a schematic diagram. The injection system 20 may be employed in a variety of applications, including but not limited to, fuel injection systems and dosing systems, among others. The injection system 20 may include a pump 22, a pressure regulating valve 24, a fluid injector 26, a reservoir 28, a controller 30 and a pressure sensor 32. A fluid 34 flows through the injection system 20, and may be selectively discharged by the injector 26. The fluid 34 may be any fluid or gas appropriate for the particular application, including but not limited to, ammonia, fuel, or urea, such as may be used in a fuel injection or dosing system, to name a few. The pump 22 moves the fluid 34 from the reservoir 28 and to the injector 26.

The pump 22 supplies a flow of pressurized fluid 34 to the injection system 20. The pump may include a pump inlet 36 fluidly connected to the reservoir 28, and a pump outlet 40 through which the pressurized fluid 34 is discharged. The pump 22 receives the fluid 34 from the reservoir 28 through a receiving line 38 fluidly connected to the pump inlet 36. The pump 22 may be a fixed displacement pump, which may include, but is not limited to, a gear pump, vane pump, axial piston pump, and radial piston pump. The pump 22 operates to produce a constant flow of the fluid 34 at a given operating speed. It will be appreciated, however, that other types of pumps, such as a variable displacement pump, may be used for supplying a flow of pressurized fluid.

The injection system 20 further includes a pump delivery line 42 fluidly connecting the pump outlet 40 to the pressure regulating valve 24 and the injector 26. A pressure regulating valve inlet passage 44 fluidly connects the pump delivery line 42 to an inlet 46 of the pressure regulating valve 24, whereas a pressure line 54 fluidly connects the pump delivery line 42 to an injector inlet 50 of the injector 26.

The pressurized fluid 34 discharged from the pump 22 may flow through the pump delivery line 42 and the pressure regulating valve inlet passage 44 to the pressure regulating valve 24. The pressure regulating valve 24 may be used to at least partially control or completely control the pressure of the fluid 34 delivered to the injector 26 through the pressure line 54. The pressure regulating valve 24 may be selectively adjusted between an open position and a closed position. The pressure of the fluid 34 delivered to the injector 26 may be controlled by opening the pressure regulating valve 24 to allow a portion of the fluid 34 from the pump delivery line 42 to bypass the pressure line 54, and instead pass though the pressure regulating valve 24.

The pressure of the fluid 34 delivered to the injector 26 may be controlled by opening the pressure regulating valve 24 to allow a portion of the fluid 34 from the pump delivery line 42 to pass though the pressure regulating valve 24 and transported back to the reservoir 28 by way of a reservoir inlet line 56, which fluidly connects an outlet port 52 of the pressure regulating valve 24 to the reservoir 28. The remaining portion of the fluid 34 not transported through the pressure regulating valve 24 may be transported to the injector 26 through the pressure line 54. The pressure level in the pressure line 54 can be controlled by regulating the amount of the fluid 34 that is redirected from the pump delivery line 42 back to the reservoir 28.

The pressure regulating valve 24 at least partially controls the pressure in the pressure line 54 by selectively allowing a portion of the fluid 34 to flow from the pump delivery line 42 into the reservoir inlet line 56. Assuming the pressure within the injection system 20 to be about generally equalized, the pressure level in the pressure line 54 may be decreased by increasing the amount of fluid transported from the pump delivery line 42 to the reservoir 28, whereas decreasing the flow of fluid 34 to the reservoir will increase the pressure in the pressure line 54. It will be appreciated that this is only one approach for controlling the pressure of the fluid delivered to the injector 26, and that other approaches may also be employed depending on the requirements of the particular application. For example, the pressure regulating valve 24 may be omitted from the injection system 20, and the pressure and flow of the fluid 34 may be controlled by varying the speed of the pump 22.

The injector 26 may include the injector inlet 50, a bypass opening 60, and an injector orifice 62. The pressure line 54 for supplying pressurized fluid to the injector 26 may be fluidly connected to the injector inlet 50. The fluid 34 enters the injector 26 through the injector inlet 50, and may exit the injector 26 through either the injector orifice 62 or the bypass opening 60.

The injector 26 may be selectively cycled between an open position and a closed position. The fluid 34 is discharged from the injector orifice 62 when operating the injector 26 in the open position, and exits the injector 26 through the bypass opening 60 when operating the injector 26 in the closed position.

The injector 26 may include a metering orifice 64 arranged downstream of the bypass opening 60. The metering orifice 64 creates a restriction in the flow path between the injector inlet 50 and an injector discharge port 63 for at least partially controlling the pressure and flow of fluid through the injector 26. Increasing the restriction by reducing the flow area of the orifice will generally produce a decrease in fluid flow through the injector at a given pressure. On the other hand, increasing the flow area of the orifice will generally result in an increase in flow through the injector at a given pressure.

The injection orifice 62 may be suitably configured to discharge the fluid 34 as a fine mist. When employing the exemplary injection system 20 as part of a dosing system, the mist may be discharged into an exhaust gas stream. The fluid 34 may also exit the injector 26 through the bypass opening 60, and may be transported to the reservoir 28 through an outlet line 68 and the reservoir inlet line 56.

Figure 2:
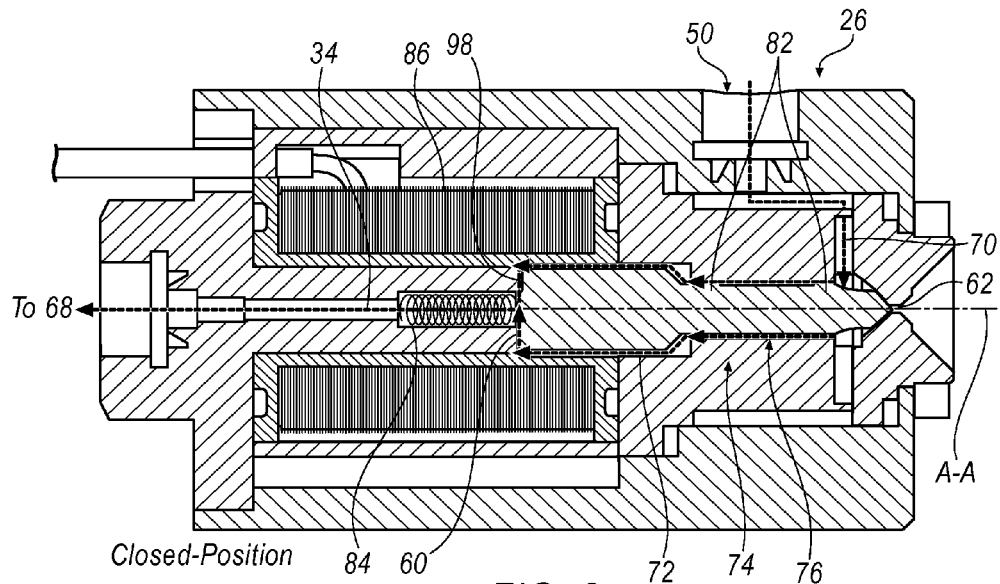
FIG. 2 is a partial cross-sectional view of the injector arranged in a closed position.
Figure 3:
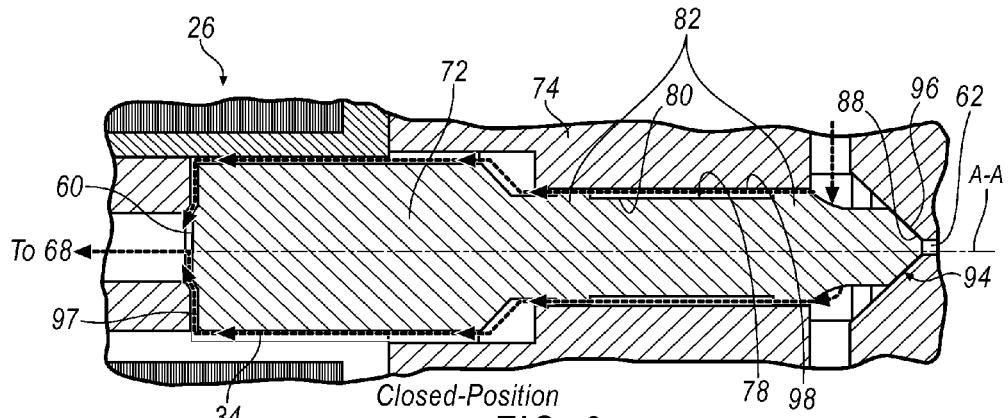
FIG. 3 is a partial cross-sectional view of the injector in FIG. 2 arranged in a closed position.
Figure 4:
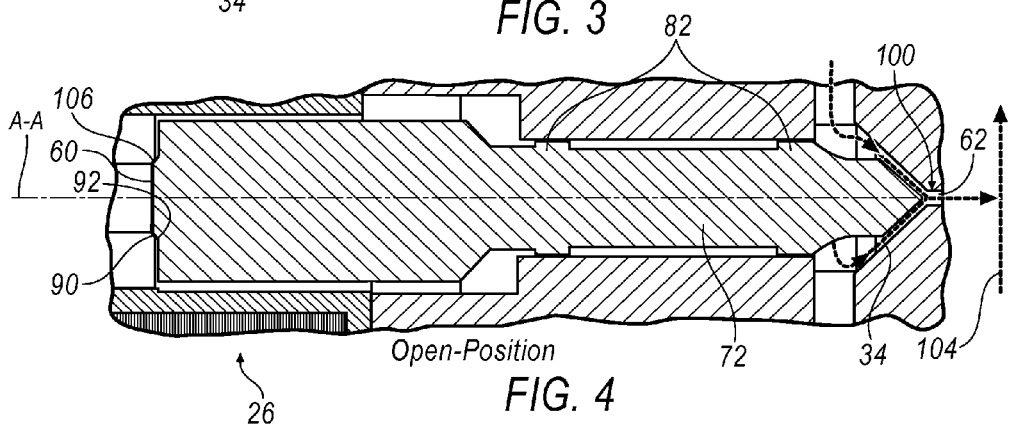
FIG. 4 is a partial cross-sectional view of the injector in FIG. 2 arranged in an open position.

FIGS. 2-4 illustrate partial cross-sectional views of the injector 26. The injector 26 may be operated between the open position and the closed position. The injector 26 may be selectively cycled between the open position and the closed positions. When the injector 26 is in the open position, the fluid 34 may be sprayed out of the injector through the injector orifice 62. When the injector 26 is in the closed position, the fluid 34 flows out of the injector 26 through the bypass opening 60 and back into the reservoir 28. When the injector 26 is in the closed position, the spray of the fluid 34 from the injector orifice 62 may be substantially blocked or reduced.

FIGS. 2-3 illustrate the injector in the closed position. The injector 26 may allow the fluid 34 to exit the injector 26 through the bypass opening 60 when arranged in the closed position. In the illustration as shown, the injector 26 may be closed at the injector orifice 62 and open at the bypass opening 60 when the injector 26 is in the closed position.

Turning to FIG. 2, the injector inlet 50 receives the fluid 34 from the pressure line 54, where the fluid 34 is then transported into a swirl chamber 70.

The injector 26 also includes an elongated needle 72 and a needle guide 74. The needle 72 may be slidably disposed within a passage 76 of the needle guide 74, thereby enabling the needle 72 to be selectively displaced in the axial direction inside of the needle guide 74. The needle 72 may be advanced towards the injector orifice 62 when the injector 26 is arranged in the closed position, and towards the bypass opening 60 when the injector is arranged in the open position.

FIG. 3 illustrates an injection chamber 78 that may be located between the needle 72 and the needle guide 74. The injection chamber 78 provides a fluid passage to allow the fluid 34 to bypass the injector orifice 62 and be discharged from the bypass opening 60. The injection chamber 78 may be annular cavity created by a clearance between a needle outer wall 80 and a needle guide inner wall 98. The fluid 34 may travel through the injection chamber 78 and out of the injector 26 from the bypass opening 60.

The needle 72 may also include at least one annular guide 82. FIGS. 2-4 illustrate the needle 72 as having two guides 82, however, it shall be appreciated that fewer or more guides may also be provided depending, at least in part, on the requirements of the particular application. The guides 82 assist the needle 72 in remaining generally centered along an axis A-A of the passage 76. The guides 82 may be scalloped to provide a passageway to allow the fluid 34 to travel past the guides 82.

Turning to FIG. 2, a biasing member 84 and a solenoid 86 may also be included with the injector 26. In one example, at least a portion of the solenoid 86 may overlay an end portion of the needle 72. The biasing member 84 exerts a generally axial biasing force upon the needle 72. The biasing member 84 may be preloaded such that the force from the biasing member 84 urges the needle 72 toward the closed position to seat the needle 72 at the injector orifice 62. It should be noted that while FIG. 2 illustrates a coil spring, any biasing member, such as a leaf spring or an elastomeric material, may be used as well.

The solenoid 86 may be configured for moving the needle 72 between the open and closed positions. The solenoid 86, when activated, may selectively exert a magnetic force to urge the needle 72 into the open position in the needle guide 74. In one example, the needle 72 may be constructed from a magnetic material, such as steel, and therefore responds to the solenoid's 86 magnetic forces. The magnetic force generated by the solenoid 86 overcomes the biasing force exerted by the biasing member 84 and moves the needle 72 toward the open position by sliding the needle 72 towards the bypass opening 60 (to the left in FIG. 4). As the needle 72 moves from the closed position to the open position, the needle 72 slides away from the injector orifice 62 towards the bypass opening 60 to open the injector orifice 62. When the solenoid 86 is deactivated, and no magnetic force is exerted, the biasing force from the biasing member 84 urges the needle 72 towards the injector orifice 62, and back into the closed position.

As seen in FIG. 4, when the injector 26 is in the open position, the needle 72 may be seated at the bypass opening 60. Moreover, a second needle sealing surface 90 may be aligned with and seals against a bypass opening seat sealing surface 92, thereby creating a seal between the needle 72 and the bypass opening 60. This seal may at least partially or even completely block the flow of the fluid 34 from passing through the bypass opening 60. Thus, as may be seen in each of FIGS. 2, 3 and 4, the injector 26 is in the open position when the needle 72 is seated at the bypass opening 60, and the injector 26 is in the closed position when the needle 72 is seated at the injector orifice 62.

In one illustration, the second needle sealing surface 90 may seal against the bypass opening sealing surface 92 to only partially block the flow of the fluid 34 through the bypass opening 60. That is, there may be minimal amounts of the fluid 34 that pass through the bypass opening 60 when the injector 26 is in the open position. This small amount of leak will also maintain a pressure at the needle 72 at the bypass opening 60 as the injector 26 opens. This pressure exerted at the bypass opening 60 may be in a direction that opposes the open position, that is, the pressure at the bypass opening 60 tends to urge the needle 72 into the closed position. Therefore, the force needed to urge the needle 72 from the open position to the closed position may be less than if the second needle sealing surface 90 seals against the bypass opening sealing surface 92 and completely blocks the bypass opening 60. In other words, the leak at the bypass opening 60 may require less force exerted by the biasing member 84 (illustrated in FIG. 2) to urge the needle 72 from the open position to the closed position.

Because there is less force needed to urge the needle 72 from the open position to the closed position when there is a leak at the bypass opening 60, the biasing member 84 may be sized optimally. That is, a smaller biasing member that exerts less force may be used if there is a leak at the bypass opening 60 when the injector 26 is open. A smaller biasing member 84 may be advantageous, as a smaller biasing member 84 typically includes a smaller packaging size and less mass.

Turning to FIG. 3, the injector 26 includes an injection orifice seat 94. More specifically, a first needle sealing surface 96 may be aligned with and seals against an injection orifice seat sealing surface 88, creating a seal between the needle 72 and the injection orifice seat 94. This seal may at least partially or even completely block the flow of the fluid 34 from passing through the injector orifice 62. With the needle 72 arranged in the closed position, at least some of the fluid 34 travels through the injector 26 and to the bypass opening 60. The fluid 34 exits the injector 26 through the bypass opening 60. As seen in FIG. 1, the bypass opening 60 may be in fluid communication with the outlet line 68.

The injector 26 also includes a bypass opening passageway 97. As illustrated in both of FIGS. 2-3, the bypass opening passageway 97 may be in fluid communication with the bypass opening 60 and the injection chamber 78, such that when the injector 26 is closed, the fluid 34 flows from the injection chamber 78 through the bypass opening passageway 97 and into the bypass opening 60.

FIG. 4 illustrates the injector 26 spraying the fluid 34 out of the injector 26 from the injector orifice 62 when the injector is in the open position, and the flow of the fluid 34 to the bypass opening 60 may be substantially blocked. The injector 34 includes an injector orifice passageway 100. The injector orifice passageway 100 may be in fluid communication with the injector orifice 62, such that when the injector 26 is opened, the fluid 34 flows though the injector orifice passageway 100, and into the injection orifice 62. When employing the fluid injection system 20 with a vehicle dosing system, the injector orifice 62 may be in fluid communication with an exhaust gas stream 104. The exhaust gas stream 104 may be transported to a pollution reduction mechanism such as a catalytic converter, where a reaction takes place between the fluid 34 and the nitrous oxides found the exhaust gas stream 104. When the exhaust gas stream 104 travels to a catalytic converter, the fluid 34 reacts with the nitrous oxides in the exhaust gas stream 104, and water and nitrogen may be produced.

When the injector is in the closed position, the needle 72 may be seated on the injection orifice seat 94. As the injector 26 is opened, the needle 72 slides from the closed position (as seen in FIGS. 2 and 3) to the open position (as seen in FIG. 4).

Figure 5:
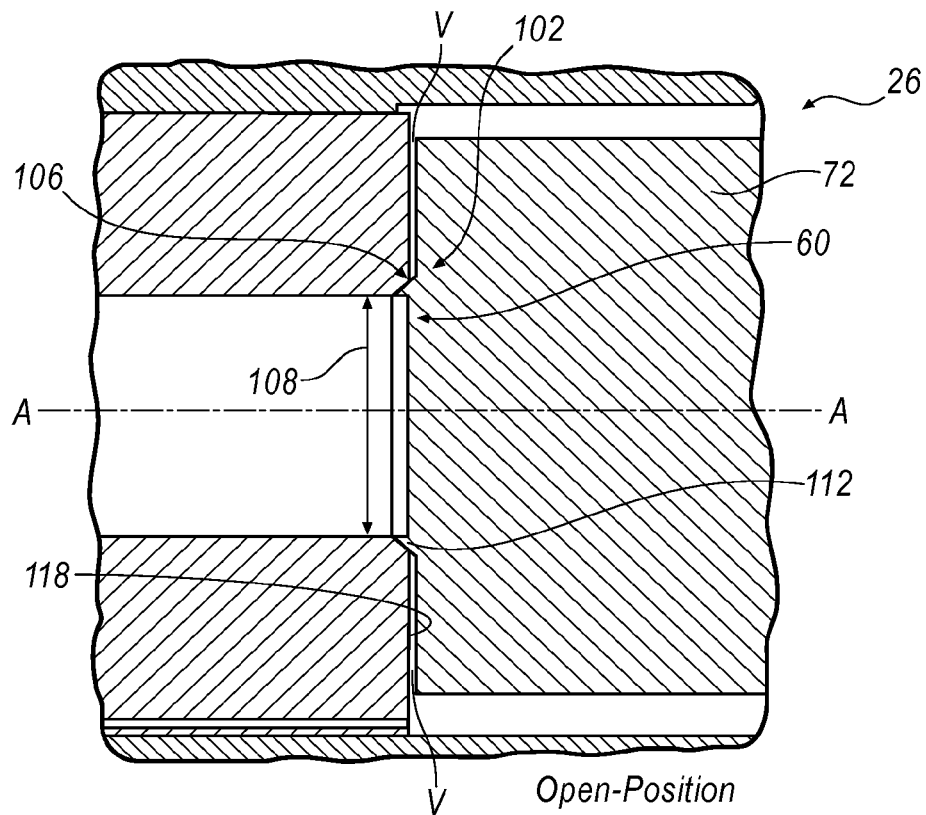
FIG. 5 is an enlarged view of the injector in FIG. 4 illustrating a seal arrangement between an injector needle and an injector body, with the injector arranged in the open position.

Referring to FIG. 5, the needle 72 may be seated on the bypass opening 60 at an inner seating feature 106. The inner seating feature 106 seals the bypass opening 60 when the injector 26 is in the open position. The inner seating feature 106 may be located on an end 102 of the needle 72 adjacent the bypass opening 60. The inner seating feature 106 abuts against the bypass opening 60 when the injector 26 is arranged in the open position. More specifically, the inner sealing feature 106 makes contact with an outer diameter 108 of the bypass opening 60 when the injector 26 is in the open position. FIG. 5 illustrates the inner seating feature 106 as a chamfered circumferential ring 112 that extends from an end of the needle 72. It shall be understood that, although the inner seating feature 106 is illustrated as the chamfered circumferential ring 112, other configurations may be used as well. In one example, the inner seating feature 106 may be any configuration that substantially blocks the flow of the fluid 34, and may be of any shape, such as, but not limited to, a raised convex surface.

Figure 6:
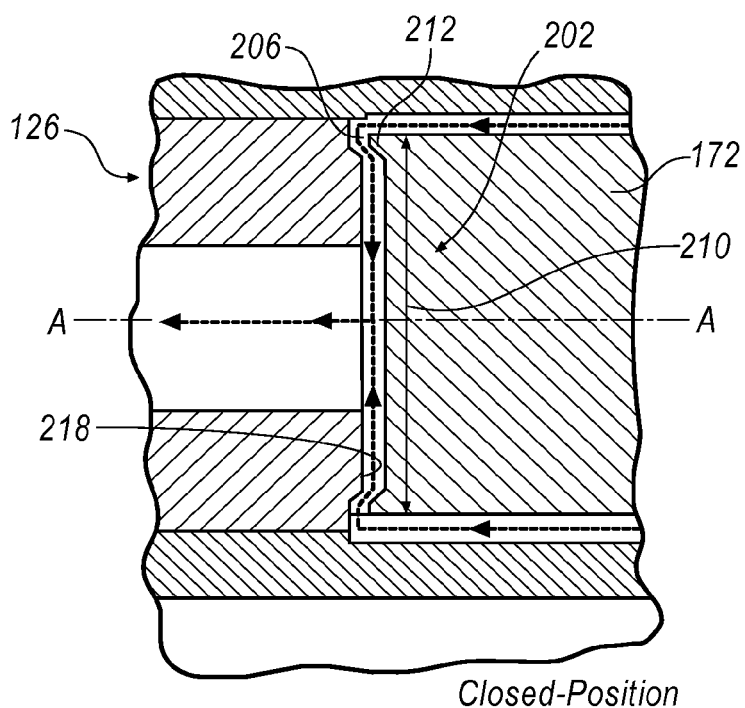
FIG. 6 is an alternative sealing arrangement between the injector needle and the injector body, with the injector arranged in the closed position.

Moreover, although FIGS. 4 and 5 illustrate the inner seating feature 106 abutted against the bypass opening 60, it is understood that other configurations may also be used to seal the bypass opening 60. For example, in one alternative illustration FIG. 6 shows an injector 126 in the closed position, where the seating feature may be located along an outer diameter of a needle 172. The seating feature may be an outer sealing feature 206, which may be located along an outer diameter 210 of the needle 172. FIG. 6 illustrates the outer sealing feature 206 as a circumferentially raised chamfer 212. The chamfer 212 may be configured for sealing the bypass opening 60 when the injector 226 is in the open position.

Referring back to FIG. 5, if there is a small amount of the fluid 34 that passes through the bypass opening 60 when the injector 26 is in the open position, pressure may be exerted between the needle 72 and a bypass opening surface 118. The volume between the end 102 of the needle 72 and the bypass opening surface 118 is illustrated as a volume V, where the pressure may collect at volume V. The pressure built up at the volume V tends to urge the needle 72 into the closed position. Therefore, the force needed to urge the needle 72 from the open position to the closed position may be less than if the volume V was not included, such as the needle 172 and the bypass opening surface 218 as illustrated in FIG. 6.

Turning to FIG. 6, as the needle 172 is urged from the closed position (as illustrated in FIG. 6) to the open position, the entire end 202 of the needle 172 seals against the bypass opening surface 218. The chamfer 212 seals against the bypass opening surface 218 for preventing pressure build up that may occur between the end 202 of the needle 172 and the bypass sealing surface 218. As a result, the force needed to urge needle 72 (illustrated in FIGS. 2-5) from the open position to the closed position may be less than the force needed to urge the needle 172 (illustrated in FIG. 6) from the open position to the closed position.

In one illustration, the injector 26 may increase the pressure drop across the injector orifice 62 when one of the injector orifice 62 and the bypass opening 60 are closed quickly to create a pressure surge. As the injector orifice 62 or the bypass opening 60 are closed, the flow of the fluid 34 may be suddenly stopped and a pressure shock wave may be formed in the fluid 34 present in the injector 26. The pressure shock wave in the injector 26 may increase the pressure at the injector orifice 62. The increased pressure drop across the injector orifice 62 may assist in spraying the fluid 34 and may result in increased atomization of the fluid 34 that is sprayed from the injector orifice 62.

Referring back to FIG. 1, the operation of the injection system 20 may be controlled by the controller 30. A connector 58 operably connects the pump 22 to the controller 30. The connector 58 may be used for providing power, such as electricity, for driving the pump 22. In addition, electronic information concerning the operating characteristics of the pump 22, such as speed and output pressure, to name a few, may be transmitted over the connector 58 from the pump 22 to the controller 30.

The controller 30 may also be operably connected to pressure sensor 32, the pressure regulating valve 24 and the injector 26 via connectors 53, 55 and 56, respectively. The pressure sensor 32 may be provided for detecting the pressure in the pressure line 54. In one exemplary illustration, the pressure in the pressure line 54 ranges from about 20 psi (0.137 MPa) to about 150 psi (1.034 MPa), and the flowrate ranges from about 20 gallons/min (0.09 cubic meters/min) to about 550 gallon/min (2.50 cubic meters/min). The pressure sensor 32 may be configured to send a signal indicative of the pressure within the pressure line 54 to the controller 30. The controller 30 may generate various control signals for controlling the operation of the various system components, including but not limited to, the pressure regulating valve 24 and the injector 26, based at least in part on the pressure information received from the pressure sensor 32. For example, it may be desirable that the inlet pressure to the injector 26 be maintained at a desired level. The controller 30 can monitor the pressure within the pressure line 54 using the pressure sensor 32. Base on the pressure information received from the pressure sensor 32, the controller 30 can formulate an appropriate control signal for controlling the operation of the pressure regulating valve 24 so as to maintain the desired inlet pressure to the injector 26.

The controller 30 may also be configured to control a duty cycle of the injector 26. The controller 30 may either pass through or formulate an appropriate control signal specifying the timing and duration of the open position and the closed position of the injector 26.

Figure 7:
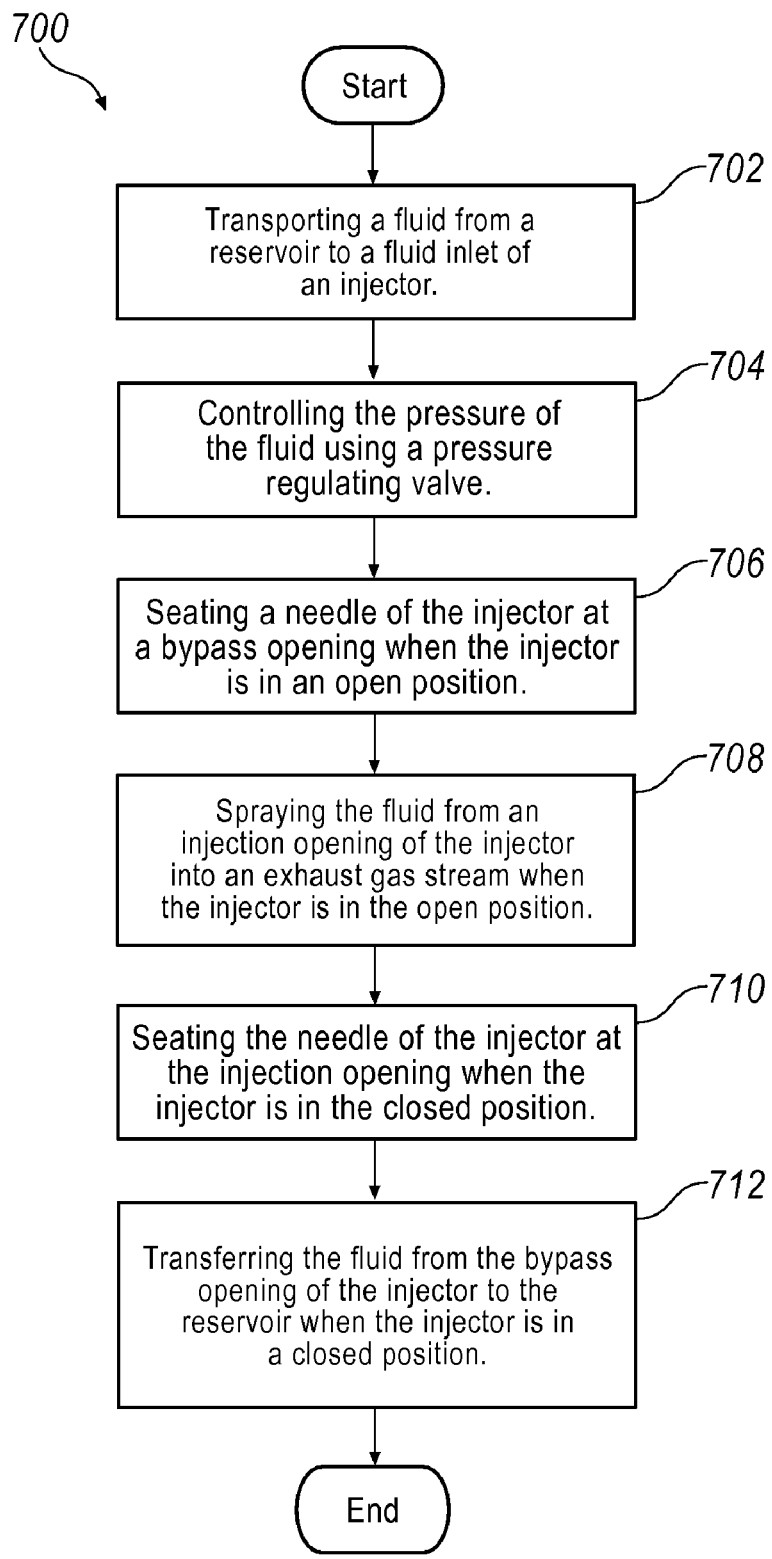
FIG. 7 is a process flow diagram illustrating a process of operating the exemplary fluid injection system.

Turning now to FIG. 7, a process 700 of injecting a fluid from an injection system into an exhaust gas is illustrated. Process 700 may begin at step 702, where the fluid 34 may be transported from the reservoir 28 to the injector inlet 50 of the injector 26. The reservoir 28 may be fluidly connected to the injector inlet 50 by the pressure line 54. The fluid 34 travels from the reservoir 28 through the receiving line 38, and to the pump 22. The pump 22 moves the fluid 34 from the pump 22 through the pump delivery line 42. The pressure regulating valve inlet passage 44 fluidly connects the pump delivery line 42 to the inlet 46 of pressure regulating valve 24, whereas the pressure line 54 fluidly connects the pump delivery line 42 to the injector inlet 50. The pressure of the fluid 34 delivered to the injector 26 may be controlled by opening the pressure regulating valve 24 to allow a portion of the fluid 34 from the pump delivery line 42 to bypass the pressure line 54, and instead pass though the pressure regulating valve 24 to be returned to the reservoir 28. The pressure line 54 may transport the fluid 34 from the pressure regulating valve 24 to the injector 26. Process 700 may then proceed to step 704.

In step 704, the flow and pressure of the fluid 34 in the pressure line 54 may be at least partially controlled by the pressure regulating valve 24. The pressure regulating valve 24 may also completely control the pressure of the fluid 34 in the pressure line 54. As seen in FIG. 1, the pressure regulating valve 24 may be connected with the pressure line 54. The pressure regulating valve 24 regulates the pressure of the fluid 34 by opening and closing at select intervals, based on control signals received from the controller 30. The pressure and flow of the fluid 34 may be controlled by allowing at least a portion of the fluid 34 from the pump delivery line 42 to pass though the pressure regulating valve 24 to be transported back to the reservoir 28 by way of the reservoir inlet line 56. The remaining fluid 34 that is not transported through the pressure regulating valve 24 may then be transported through the pressure line 54 to the injector 26. Process 700 may then proceed to step 706.

In step 706, the needle 72 of the injector 26 may be seated at the bypass opening 60 when the injector 26 is in the open position. Moreover, as illustrated in FIG. 4, the second needle sealing surface 90 may be aligned with and seals against the bypass opening seat sealing surface 92. A seal may be created between the needle 72 and the bypass opening 60. The seal may at least partially or completely block the flow of the fluid 34 from passing through the bypass opening 60. Process 700 may then proceed to step 708.

In step 708, the fluid may be sprayed from the injector orifice 62 of the injector 26 when the injector 26 is in the open position. In one illustration, the fluid 34 is sprayed into the exhaust gas stream 104. The injector 26 sprays the fluid 34 out of the injector orifice 62. The injector orifice 62 may be in fluid communication with the exhaust gas stream 104. The exhaust gas stream 104 may be connected with a catalytic converter, where a reaction takes place between the fluid 34 and the nitrous oxides found the exhaust gas stream 104. Process 700 may then proceed to step 710.

In step 710, the needle 72 of the injector 26 may be seated at the injector orifice 62 when the injector 26 is in the closed position. As seen in FIG. 3, the needle 72 may be seated on the injection orifice seat 94, where the first needle sealing surface 96 may be aligned with and seals against the injection orifice seat sealing surface 88, creating a seal between the needle 72 and the injection orifice seat 94. The seal may at least partially or completely block the flow of the fluid 34 from passing through the injector orifice 62 when the injector 26 is in the closed position. Process 700 may then proceed to step 712.

In step 712, the fluid 34 may be allowed to exit the injector 26 from the bypass opening 60 of the injector 26 and into the reservoir 28 when the injector is in the closed position. As seen in FIG. 1, the bypass opening 60 may be in communication with the reservoir 28. The fluid 34 leaves the injector 26 from the bypass opening 60. The fluid 34 may then flow through the outlet line 68, and into the reservoir 28. Process 700 may then terminate.

The present disclosure has been particularly shown and described with reference to the foregoing illustrations, which are merely illustrative of the best modes for carrying out the disclosure. It should be understood by those skilled in the art that various alternatives to the illustrations of the disclosure described herein may be employed in practicing the disclosure without departing from the spirit and scope of the disclosure as defined in the following claims. It is intended that the following claims define the scope of the disclosure and that the method and apparatus within the scope of these claims and their equivalents be covered thereby. This description of the disclosure should be understood to include all novel and non-obvious combinations of elements described herein, and claims may be presented in this or a later application to any novel and non-obvious combination of these elements. Moreover, the foregoing illustrations are illustrative, and no single feature or element is essential to all possible combinations that may be claimed in this or a later application.

What is claimed is:

1. An injector for an injection system, comprising:
   a first opening configured for spraying a fluid from the injector;
   a second opening configured for allowing the fluid to exit the injector;
   an open position in which the injector is configured for spraying the fluid from the first opening and the flow of the fluid to the second opening is substantially blocked, and the injector is in the open position when the needle engages the second opening; and
   a closed position when the needle engages the first opening for allowing the fluid to exit the injector from the second opening and for substantially blocking the spray of the fluid from the first opening.

2. The injector as recited in claim 1, where the injector further comprises an injection orifice seat, the needle seated on the injection orifice seat when the injector is in the closed position.

3. The injector as recited in claim 1, where the injector further comprises one of an inner seating feature and an outer seating feature, wherein the needle is seated on one of the inner seating feature and the outer seating feature when the injector is in the open position.

4. The injector as recited in claim 1, where the injector further comprises an injection chamber located between the needle and the needle guide, the injection chamber fluidly connecting the first opening to the second opening.

5. The injector as recited in claim 1, where the injector further includes a biasing member operably connected to the needle, the biasing member exerting an axial biasing force upon the needle for urging the needle towards the closed position.

6. The injector as recited in claim 5, where the injector further includes a solenoid for selectively exerting a magnetic force to for urging the needle into the open position.

7. The injector as recited in claim 6, where the needle is constructed from a magnetic material.

8. The injector as recited in claim 6, where at least a portion of the solenoid overlays an end portion of the needle.

9. The injector as recited in claim 1, where the injector further includes a metering orifice arranged downstream of the second opening and a discharge port, the metering orifice creating a restriction in flow between the first opening and the discharge port of the injector.

10. An injection system for injecting a fluid, comprising:
    an injector including an first opening and a second opening, the first opening for spraying the fluid from the injector, and the second opening for allowing the fluid to exit the injector;
    a reservoir tank in communication with the second opening;
    a pressure regulating valve for at least partially controlling an inlet pressure to the injector;
    an open position wherein the injector is configured for spraying the fluid from the first opening into an exhaust gas and the flow of the fluid to the second opening is substantially blocked; and
    a closed position wherein the injector is configured for allowing the fluid to exit the injector from the second opening and into the reservoir tank;
    wherein the injector is configured for substantially blocking the spray of the fluid from the first opening when the injector is in the closed position.

11. The system as recited in claim 10, where the injector further comprises a needle and a needle guide, wherein the needle is slidably disposed within a passage of the needle guide.

12. The system as recited in claim 11, where the injector is in the closed position when the needle engages the first opening, and the injector is in the open position when the needle engages the second opening.

13. The system as recited in claim 10, further comprising a pressure sensor for sensing the inlet pressure to the injector.

14. The injector as recited in claim 10, further comprising a pump fluidly connected to the injector.

15. A method of injecting a fluid from an injection system, comprising the steps of:
    transporting the fluid from a reservoir tank to a fluid inlet of an injector;
    spraying the fluid from a first opening of the injector when the injector is in an open position; and
    allowing the fluid to flow through an injection chamber to exit the injector from a second opening of the injector and into the reservoir tank when the injector is in a closed position;
    wherein the injector substantially blocks the spraying of the fluid from the first opening when the injector is in the closed position and the flow of the fluid to the second opening is substantially blocked when the injector is in the open position.

16. The method as recited in claim 15, further comprising the step of communicating the fluid from the second opening when the injector is in the open position.

17. The method as recited in claim 15, further comprising the step communicating the fluid from the first opening when the injector is in the closed position.

18. The method as recited in claim 15, further comprising the step of at least partially controlling the flow and pressure of the fluid in the pressure line by a pressure regulating valve.

* * * * *

UNITED STATES PATENT AND TRADEMARK OFFICE
CERTIFICATE OF CORRECTION

PATENT NO. : 7,980,483 B2
APPLICATION NO. : 12/250220
DATED : July 19, 2011
INVENTOR(S) : Dale A. Stretch It is certified that error appears in the above-identified patent and that said Letters Patent is hereby corrected as shown below:

In the Claims:

At column 9, after line number 40 and before line number 41, insert the following sentence:

--a needle and a needle guide, wherein the needle is slidably disposed within a passage of the needle guide;--

Signed and Sealed this
Twenty-second Day of November, 2011

David J. Kappos
*Director of the United States Patent and Trademark Office*